(12) United States Patent
Hernandez Ramirez et al.

(10) Patent No.: US 9,640,962 B2
(45) Date of Patent: May 2, 2017

(54) POWER CONTROL SYSTEM HAVING MODULES

(71) Applicant: Molex, LLC, Lisle, IL (US)

(72) Inventors: Carlos Alberto Hernandez Ramirez, Guadalajara (MX); Danil Milchtein Peltsverger, Guadalajara (MX); Edmundo Delmotte, Guadalajara (MX); Ramses Rubio, Guadalajara (MX); Jesus Contreras, Guadalajara (MX)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/041,604

(22) Filed: Feb. 11, 2016

(65) Prior Publication Data

US 2016/0233605 A1    Aug. 11, 2016

Related U.S. Application Data

(60) Provisional application No. 62/114,654, filed on Feb. 11, 2015.

(51) Int. Cl.
| | | |
|---|---|---|
| *H01R 13/60* | (2006.01) | |
| *H01R 13/66* | (2006.01) | |
| *H02G 3/32* | (2006.01) | |
| *H02G 3/00* | (2006.01) | |

(52) U.S. Cl.
CPC ............... *H02G 3/32* (2013.01); *H02G 3/00* (2013.01)

(58) Field of Classification Search
CPC .. H01R 13/62; H01R 13/6395; H01R 13/518; H01R 24/525; H01R 24/78
USPC ................................. 439/533, 535, 373
See application file for complete search history.

(56) References Cited

U.S. PATENT DOCUMENTS

| | | | | |
|---|---|---|---|---|
| 3,879,101 | A * | 4/1975 | McKissic ............... | H01R 13/70 439/535 |
| 4,485,282 | A * | 11/1984 | Lee .......................... | H02G 3/18 174/53 |
| 6,309,248 | B1 * | 10/2001 | King ................... | H01R 13/7135 361/42 |
| 6,547,588 | B1 * | 4/2003 | Hsu ....................... | H01R 13/518 439/532 |
| 6,617,511 | B2 * | 9/2003 | Schultz .................. | H01R 24/70 174/50 |
| 6,843,680 | B2 * | 1/2005 | Gorman ............... | H01R 31/065 439/535 |
| 6,884,111 | B2 * | 4/2005 | Gorman ............... | H01R 31/065 174/53 |
| 7,160,147 | B1 * | 1/2007 | Stephan .................... | H01R 9/24 174/60 |
| 7,232,336 | B1 * | 6/2007 | Evans .................... | H02G 3/086 439/535 |

(Continued)

*Primary Examiner* — Hae Moon Hyeon
(74) *Attorney, Agent, or Firm* — James A. O'Malley

(57) ABSTRACT

A power control system is provided that includes a receptacle and a module. The receptacle is hard-wired to a power distribution system, such as conventional 120 VAC. The module can be removable inserted into the receptacle and can provide desired functionality, such as power deliver, wireless communication and actuation. By providing a receptacle that accepts multiple modules that each can have different functionality and by allowing a user to readily remove replace modules in the receptacle, a useful and flexible control system can be set up.

19 Claims, 14 Drawing Sheets

(56) References Cited

U.S. PATENT DOCUMENTS

| | | | | |
|---|---|---|---|---|
| 7,273,392 B2 * | 9/2007 | Fields | ............... | H01R 25/00 174/53 |
| 8,288,650 B1 * | 10/2012 | Baldwin | ............ | H02G 3/081 174/50 |
| 8,690,601 B2 * | 4/2014 | Perritt | ............... | H02G 3/126 439/535 |
| 8,794,997 B2 * | 8/2014 | Tin | ...................... | H02J 1/00 439/535 |
| 8,981,217 B1 * | 3/2015 | Baldwin | ............ | H02G 3/081 174/50 |
| 2009/0247006 A1 * | 10/2009 | Thompson | ......... | H02G 3/121 439/527 |
| 2012/0088399 A1 * | 4/2012 | Perritt | ............... | H02G 3/126 439/535 |
| 2013/0267116 A1 * | 10/2013 | Tin | ...................... | H02J 1/00 439/535 |

\* cited by examiner

POWER CONTROL SYSTEM HAVING MODULES

RELATED APPLICATIONS

This application claims priority to U.S. Provisional Appln. No. 62/114,654, filed Feb. 11, 2015.

TECHNICAL FIELD

This disclosure relates to the field of electrical power distribution, more specifically to the modular control of power distribution.

DESCRIPTION OF RELATED ART

Power receptacles are ubiquitous, and other than variations to account for voltage and country standards, are used throughout the world. A typical installation will involve running wires to a receptacle that is mounted in the wall. A switch or power outlet (or sometimes a combination of both) will be connected to the wires in the receptacle and the switch/power outlet used to provide power to other fixtures and/or systems that are plugged into or electrically connected to the receptacle.

While the above configuration is effective (as can be appreciated by its widespread use), the internet of things (IoT) will enable many devices throughout a room to be connected to a hub that is not necessarily a simple switch but instead may include intelligence to allow the devices to operate more efficiently and/or effectively. These devices may rapidly evolve over a period of several years, creating the need to update the power supply and/or control systems. For example, a device may initially be controlled by a proprietary protocol but with advances in standard protocols the need for the proprietary protocol may go away, causing the end user to desire a new method of controlling the device. While consumers are perfectly capable of replacing portable devices and devices that are coupled to the electrical system, it is more problematic to change the electrical distribution.

Typically someone that has suitable training (e.g., an electrician) is required to change out a receptacle. This can involve shutting off the power, replacing the switch/power outlet, and then turning the power back on. Due to the skill involved in setting up and altering electrical distribution (along with the substantial dangers that can result if the project is done incorrectly), the individuals that can perform such activities tend to be expensive to hire. Certain individuals would therefore appreciate a method of altering switches and power outlets that is more flexible and simple to perform.

SUMMARY

A power control system is disclosed that includes a receptacle that can be mounted in a room. The receptacle is connected to incoming wires that provide electrical power to the receptacle. The receptacle in turn includes outgoing wires that are intended to control devices. The receptacle includes one or more module sockets. Each module socket can include two opposing rails that that are configured to guide and orient an inserted module. The module socket further can further include two retaining notches positioned on the opposing rails. At a bottom of the module socket there is a power terminals that are touch-safe. When a module is inserted into the module socket the module has contacts that are directed toward the power terminals. The module includes releasable latches that engages the retaining notches when the contacts are connected to the power terminals. The modules can have various functions, depending on the intended uses.

BRIEF DESCRIPTION OF THE DRAWINGS

The present invention is illustrated by way of example and not limited in the accompanying figures in which like reference numerals indicate similar elements and in which.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The power control system integrates connectors & terminals, printed circuit board (PCB) assemblies, molded components and fixtures, Universal Serial Bus (USB) technology and eventually capacitive switch technology, into a new interconnect system, and is intended to interact with a variety of types and standards of outlet modules. As can be appreciated, once the receptacle is installed the power control system does not require any tools or expertise to switch out modules.

Figure 1:
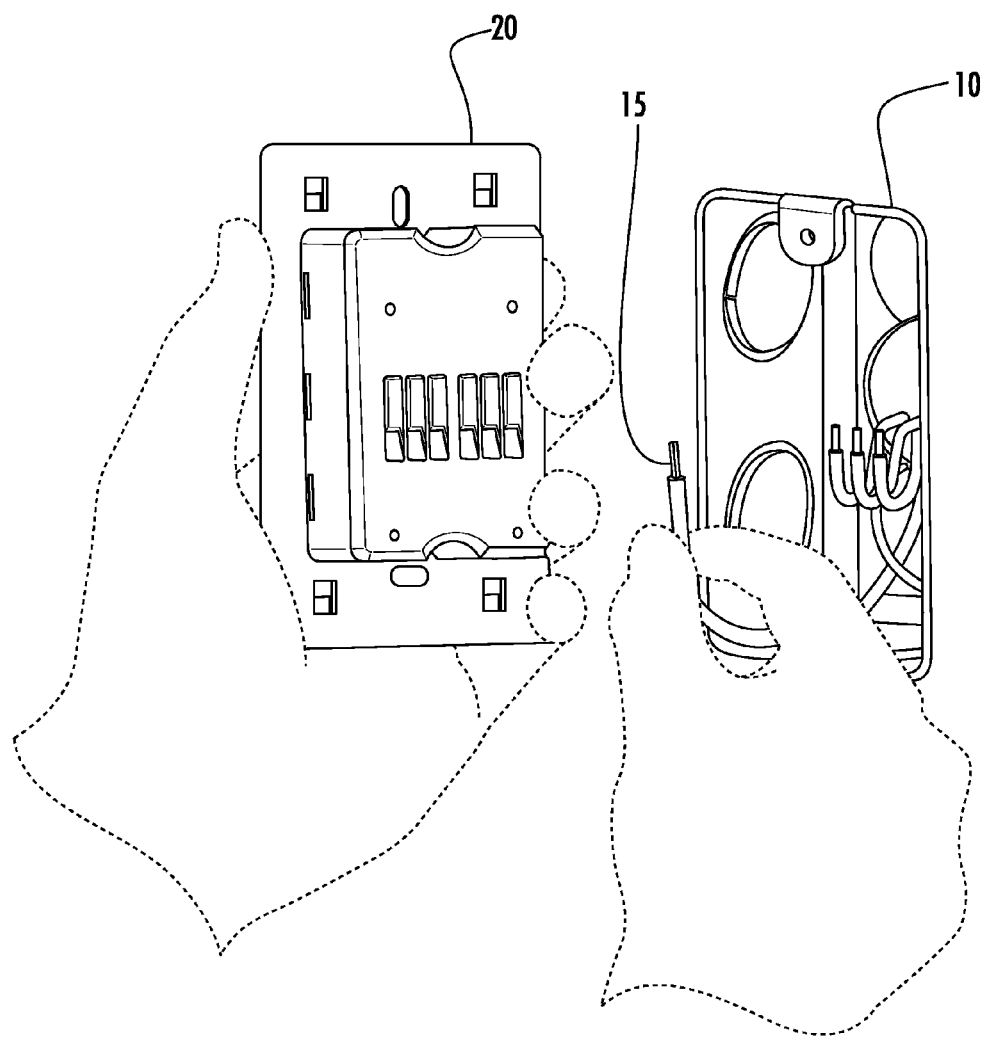
FIG. 1 illustrates a perspective view features of an embodiment of a receptacle being connected to a box.
Figure 2:
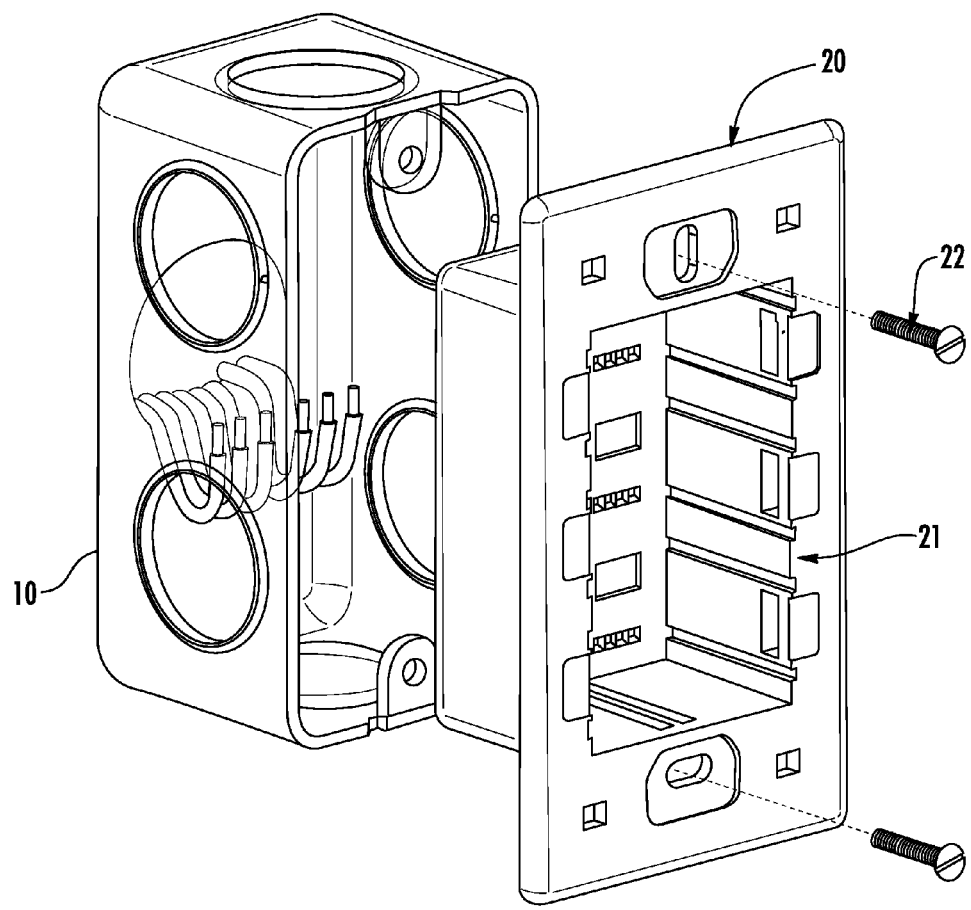
FIG. 2 illustrates a perspective exploded view of an embodiment of a receptacle and a box.
Figure 3:
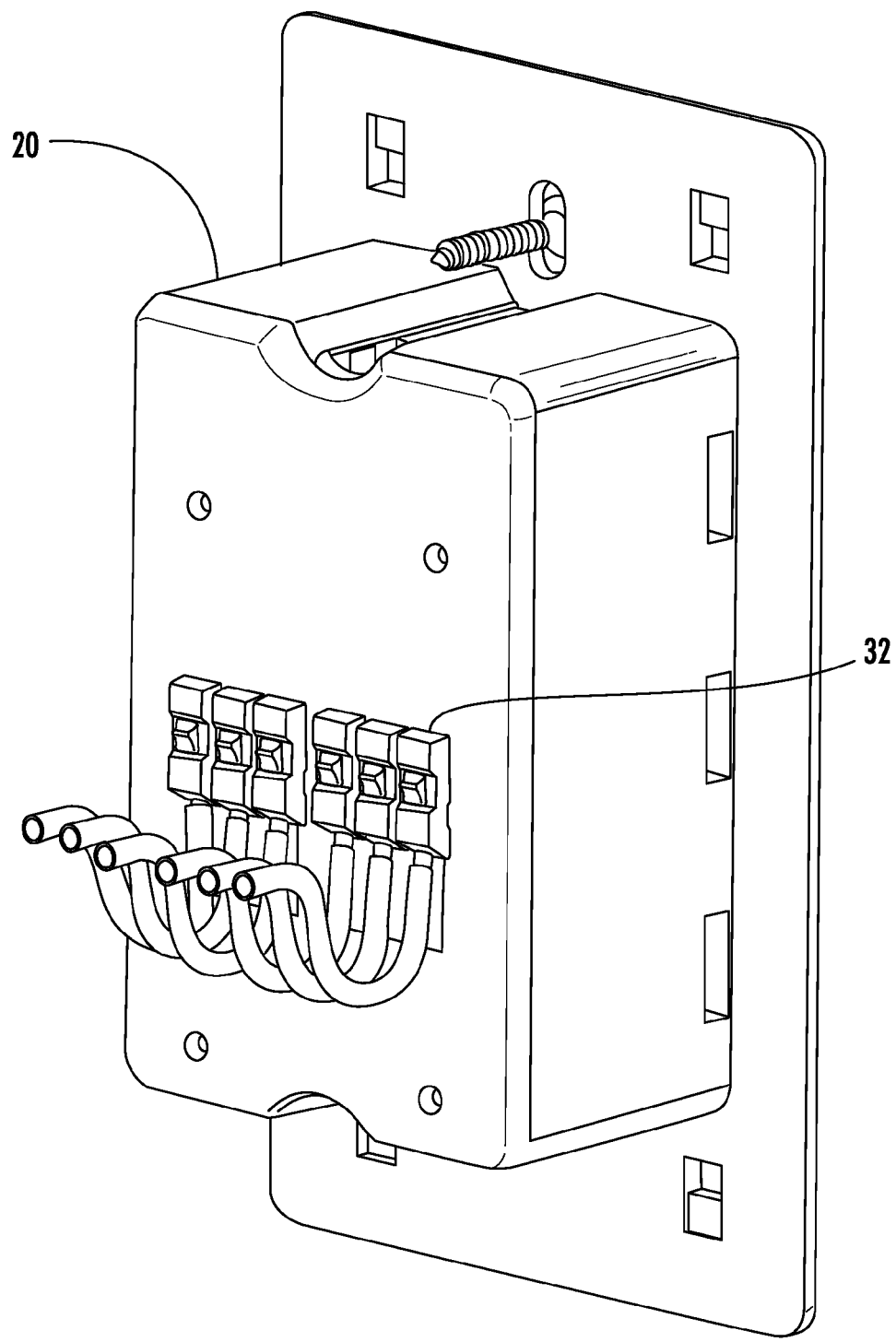
FIG. 3 illustrates a perspective view of a receptacle connected to wires.
Figure 4:
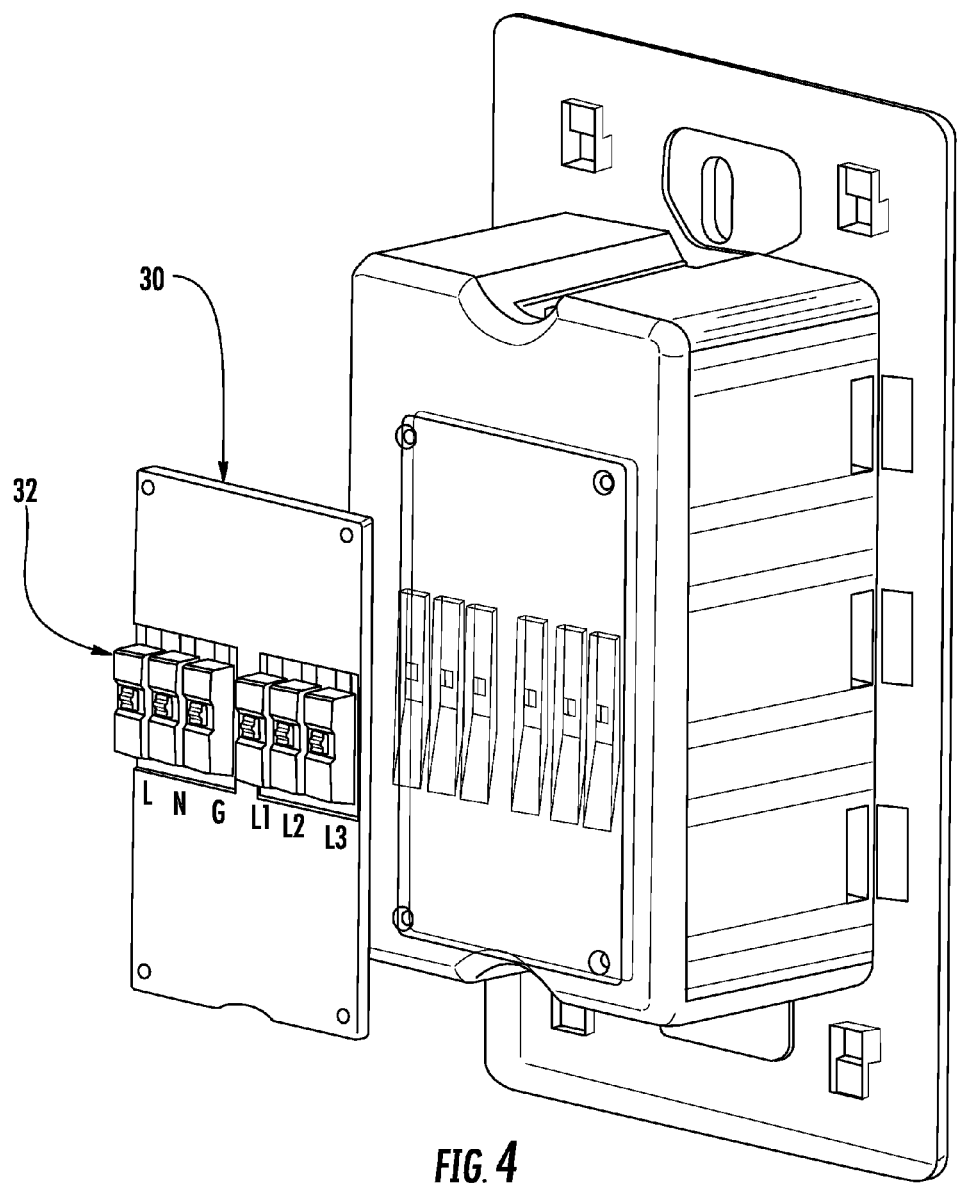
FIG. 4 illustrates a perspective exploded view of a receptacle.
Figure 5:
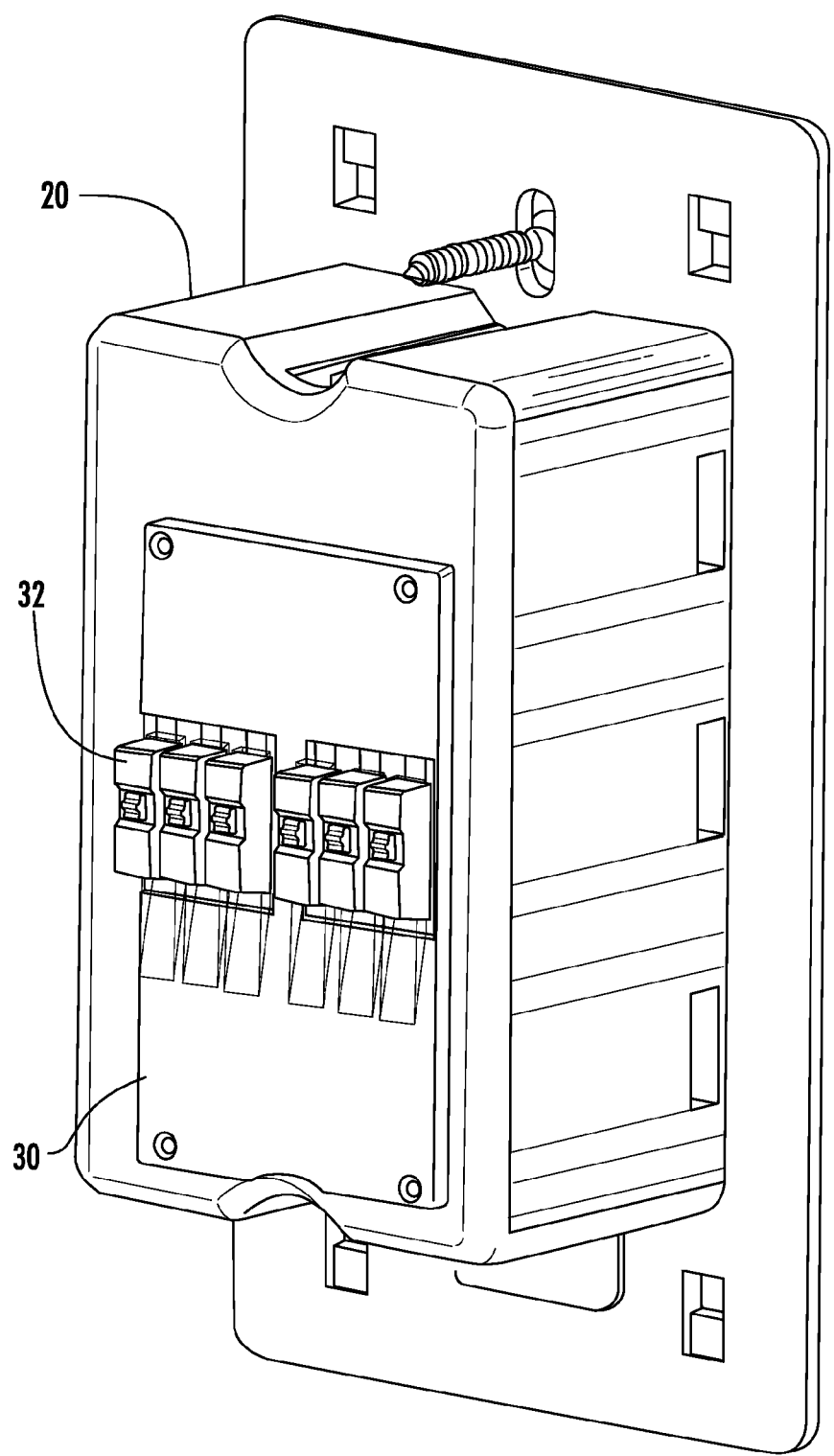
FIG. 5 illustrates a perspective view of an embodiment of a receptacle.
Figure 6:
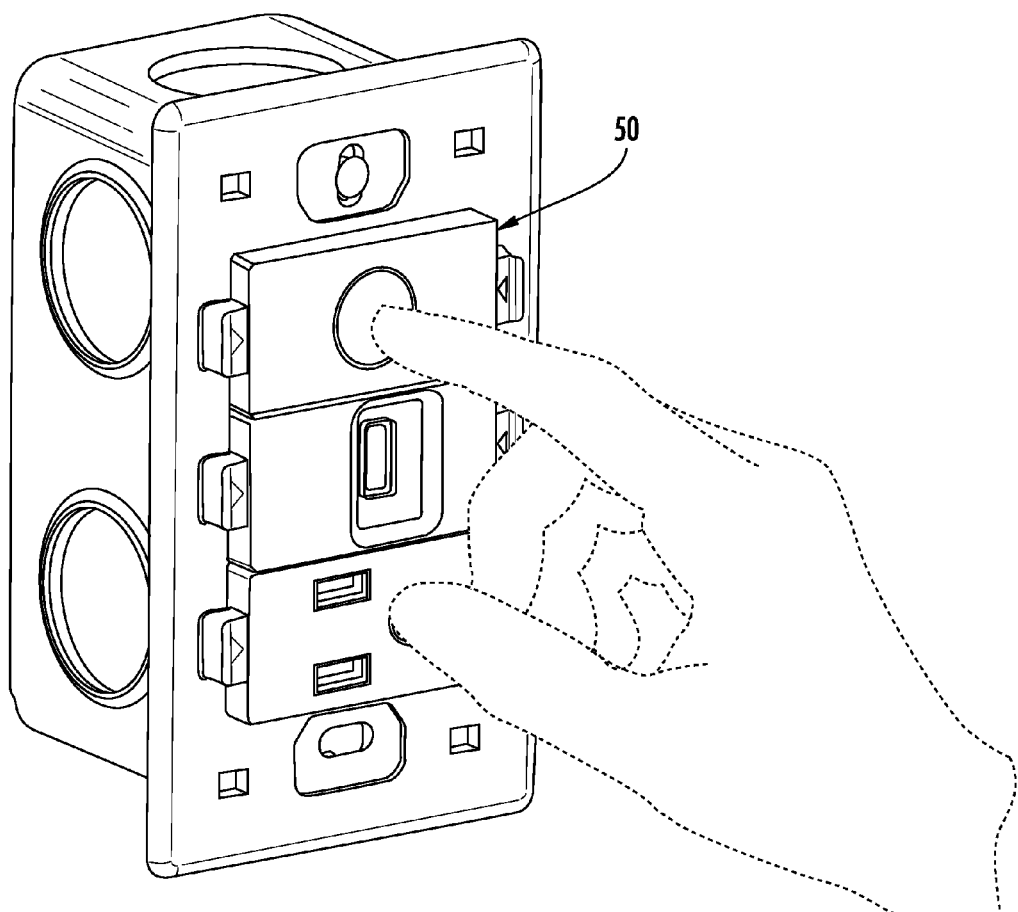
FIG. 6 illustrates a perspective view of an embodiment of a receptacle loaded with modules.
Figure 7:
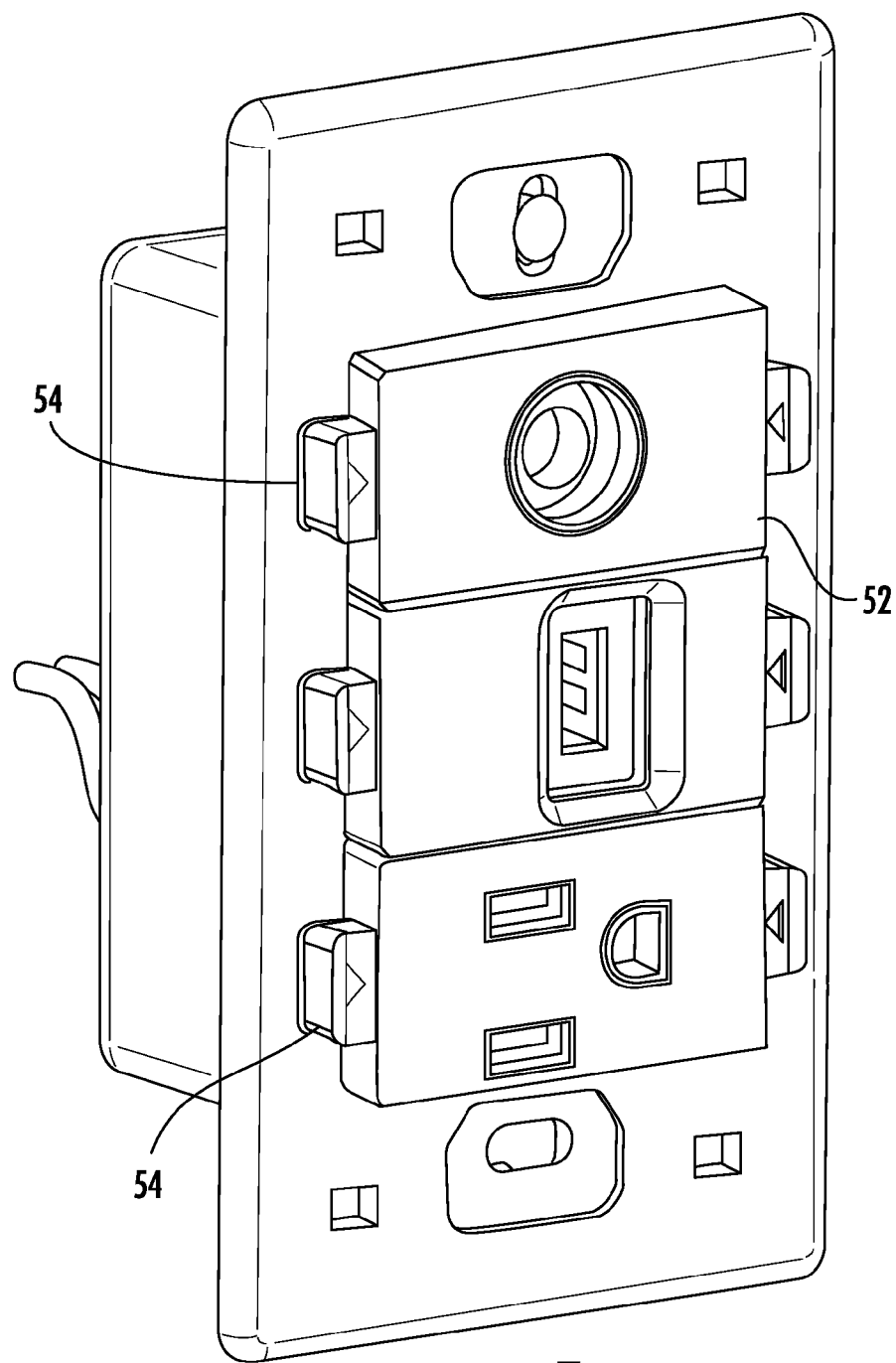
FIG. 7 illustrates a perspective view the embodiment depicted in FIG. 6 with additional details being called out.
Figure 8:
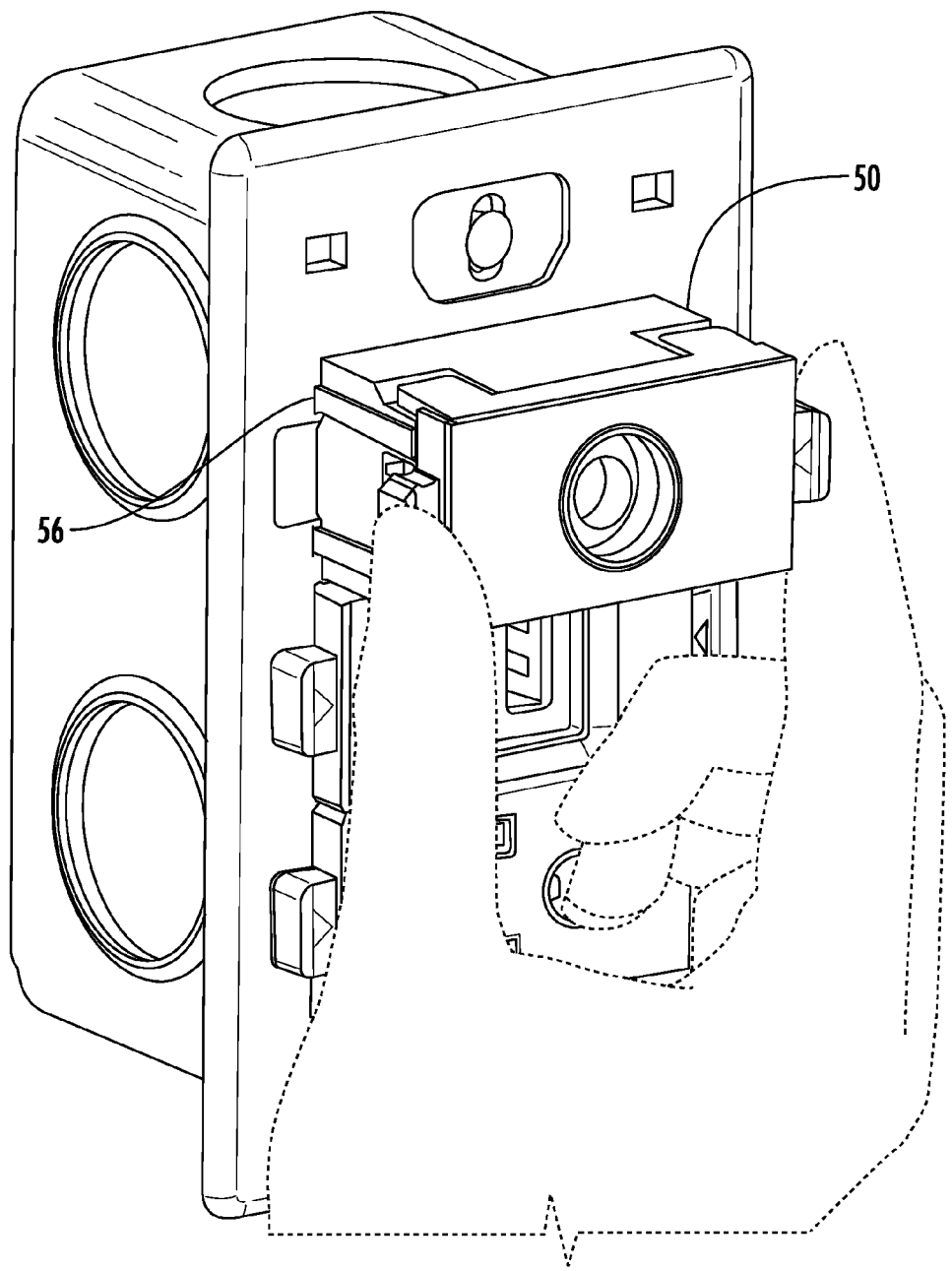
FIG. 8 illustrates a perspective view of a user inserting a module into a receptacle.
Figure 9:
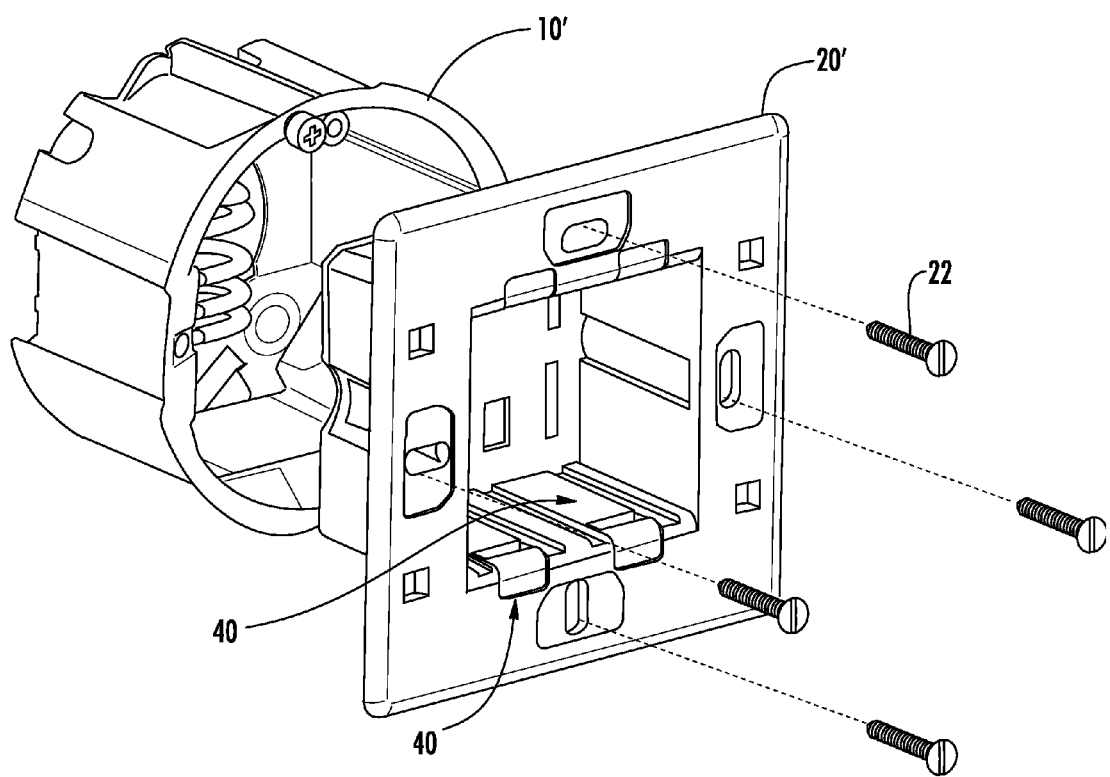
FIG. 9 illustrates a perspective view of another embodiment of a receptacle that can mount in a box.
Figure 10:
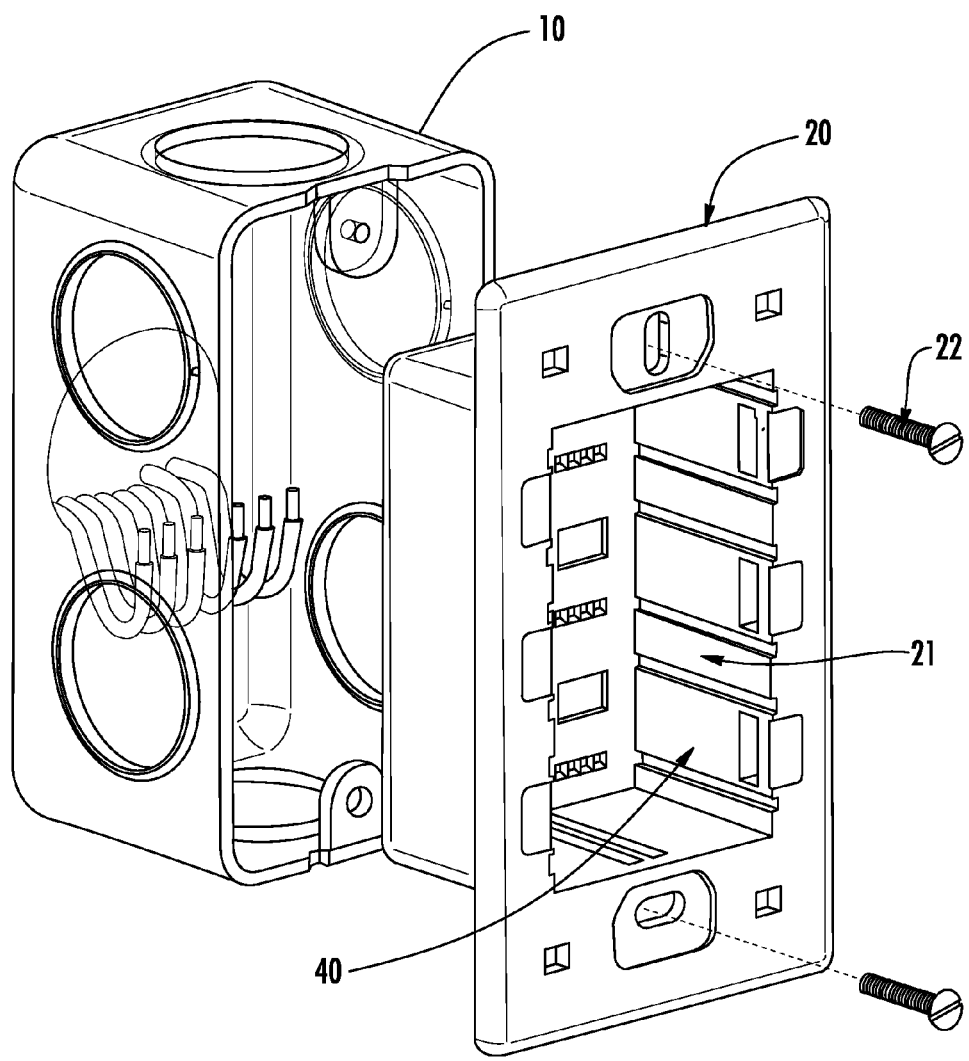
FIG. 10 illustrates a perspective exploded view of an embodiment of a receptacle and a box.
Figure 11:
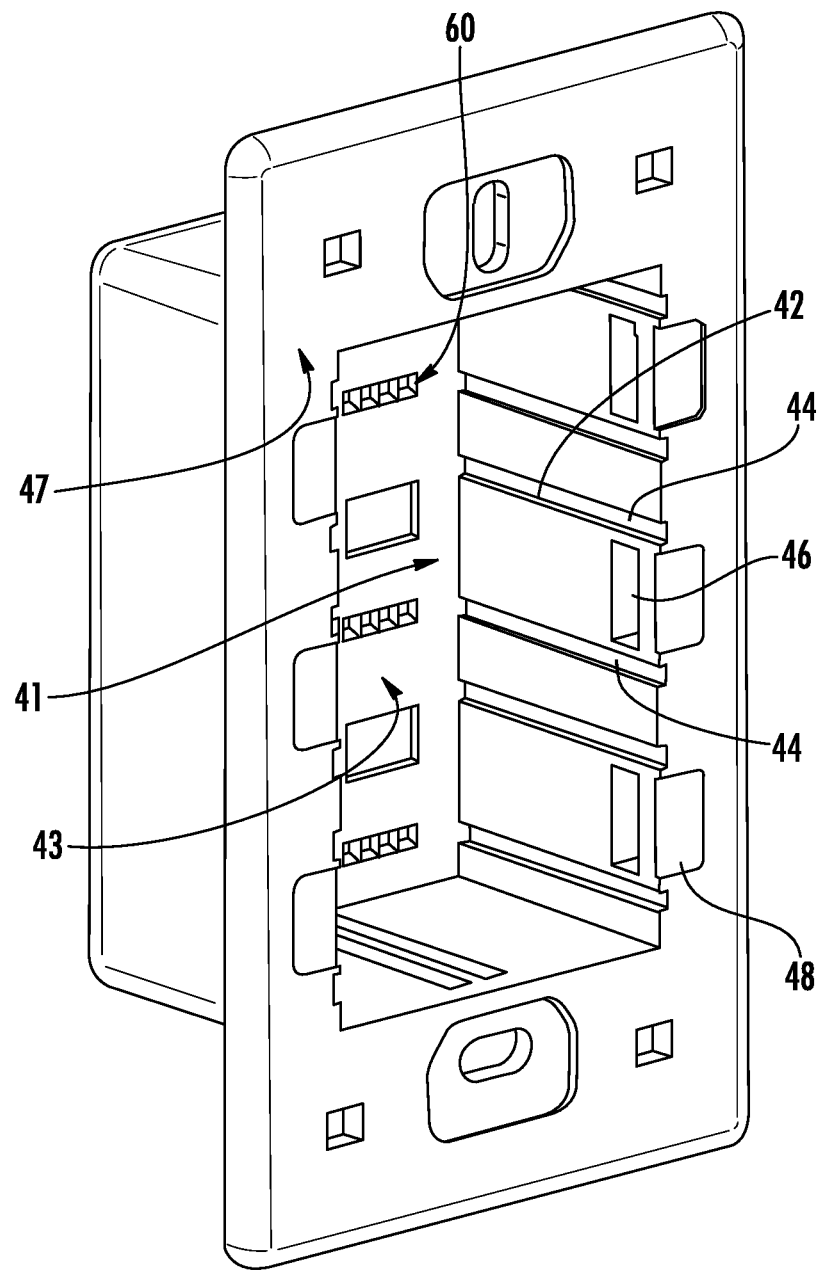
FIG. 11 illustrates a perspective enlarged view of the receptacle depicted in FIG. 10.
Figure 12:
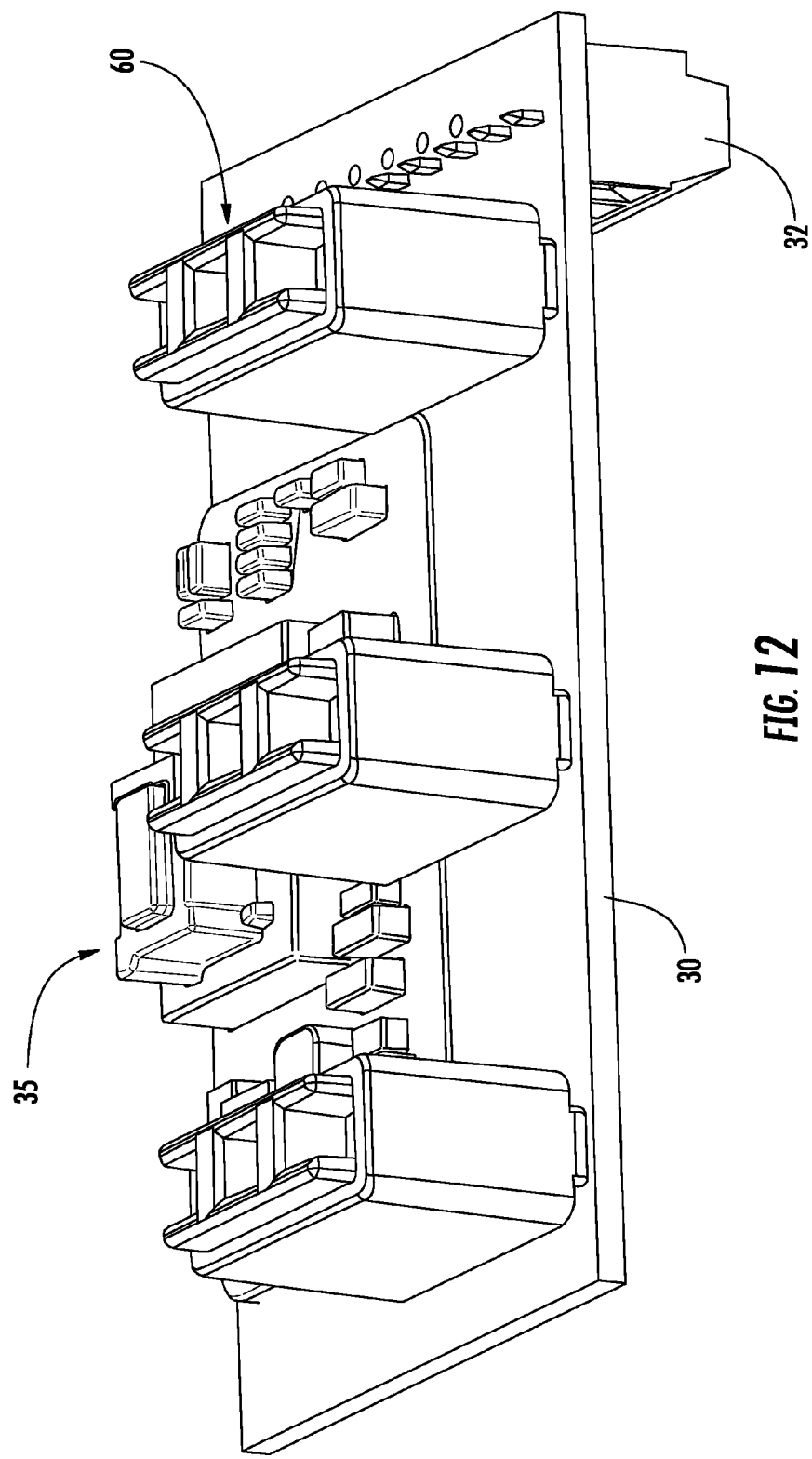
FIG. 12 illustrates a perspective view of an embodiment of a back plate.
Figure 13:
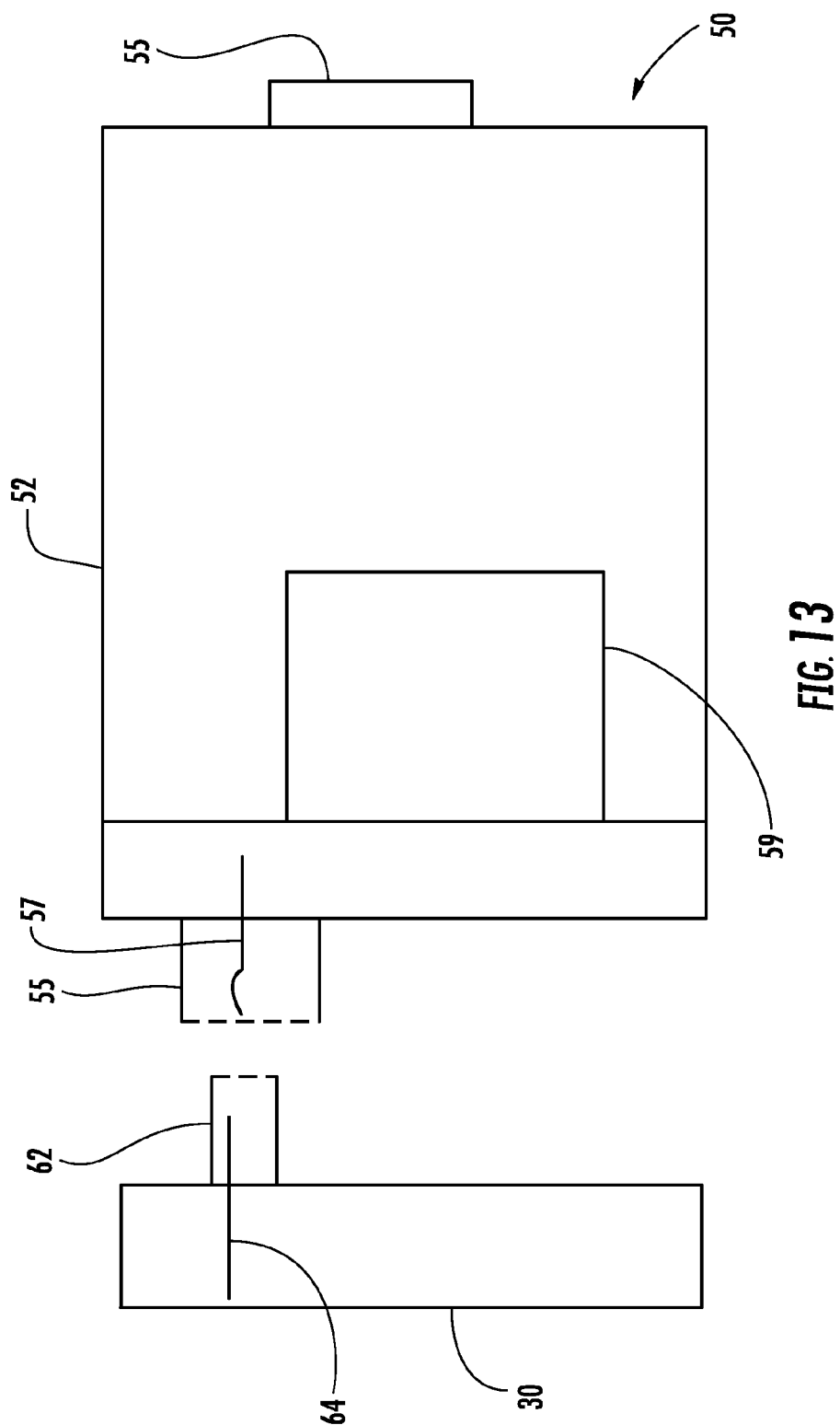
FIG. 13 illustrates a schematic representation of power terminals and contacts configured to mate together.
Figure 14:
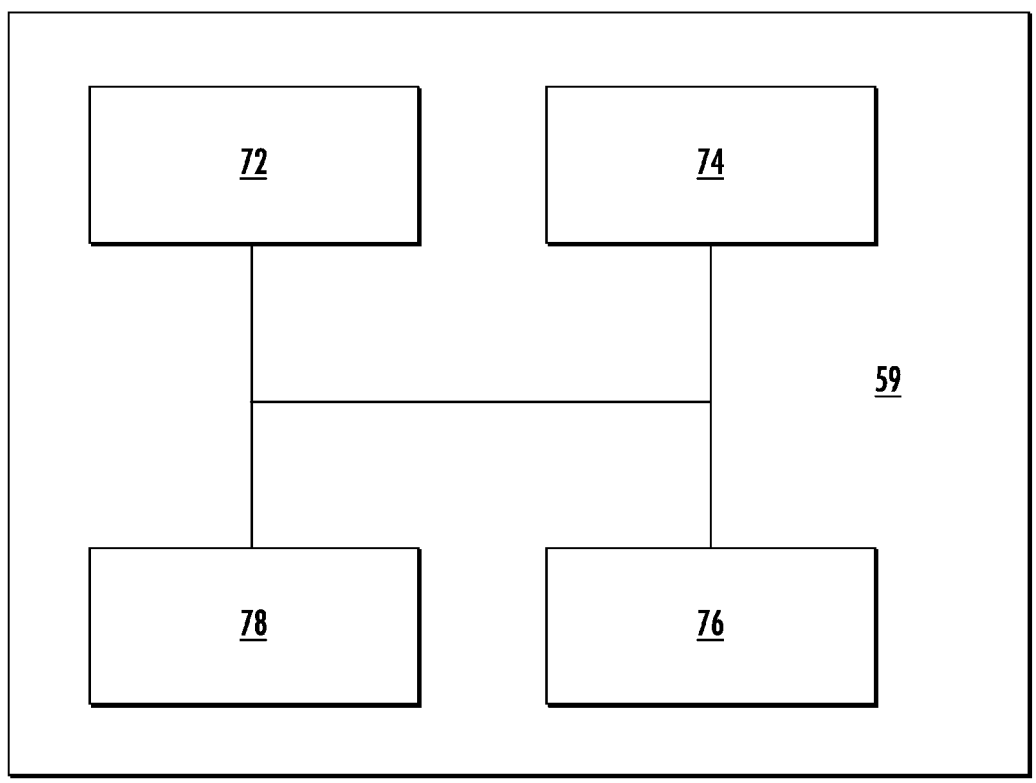
FIG. 14 illustrates a schematic representation of an embodiment of a module circuitry.

As can be appreciated from FIGS. 1-12, various configurations of power control systems are possible. In general, a box 10, 10' is provided and a receptacle 20, 20' having a recess 21 is mounted thereto via fasteners 22. The box 10 includes wires 15 that are connected to wire terminals 32. The wire terminals 32 can be poke-in connectors or screw-type connectors. Generally speaking, poke-in wires are more suitable for use with solid wires while screw-type connectors tend to work better with stranded wires. The wire terminals 32 are mounted on a back plate 30 that can be a PCB or a substrate that supports a PCB (or similar elements). The back plate 30 connects the wire terminals 32 to power connectors 60 and the back plate 30 may include circuitry 35 that allows for desired conditioning and modification of the power provided to the power connectors 60. The power connector 60 can extend into the recess 21 of the receptacle 20 or it can be configured to be substantially flush with a bottom wall 43 of a module socket 40. Either way the power connector 60 should have power terminals 64 inside a housing 62 that are configured so that the power terminals 64 are touch-safe. This means that the power connector 60 should meet applicable creepage and clearance requirements. In one embodiment the power terminals 64 can be protected by a removable shroud that is translated out of the way when a module is inserted. In another embodiment the power terminals 64 can be recessed slightly behind the housing 62 so as to decrease the chance of an accidental contact with something inserted into the receptacle 20. Alternatively the power terminals 64 can just be configured so that a human finger cannot touch them and a cover can be placed over the power terminals 64 when a module 50 is not inserted into the receptacle 20. It should be noted that these creepage and clearance requirements can change depending on the country the product is being used in and therefore the design of the power connector 60 may need to be modified depending on local requirements.

The power connector 60 is positioned in the recess 21 which defines the module socket 40 that can be defined by two opposing rails 41. The rails 41, as depicted, are defined by a shoulder 42 surrounded by two grooves 44. As depicted, each rail 41 includes retaining notch 46 positioned near the front face 47 and may include a latch recess 48 to allow a latch 54 on the a module 50 to be configured so as to allow the module 50 to be mounted more flush with the receptacle 20. The retaining notch 46 allows the module 50, upon insertion, to be carefully aligned with the corresponding power connector 60 and once fully inserted, the latch 54 engages the retaining notches 46 in a releasable manner so that the inserted module 50 is securely fastened to the corresponding receptacle 20. It should be noted that the rail 41 could also be defined by one or more grooves rather than the shoulder 42.

The module 50 includes a housing 52 that supports two or more contacts 57 and may include an optional shroud 55 that helps protect the contacts 57 during handling. The depicted module 50 also includes projections 56 that are configured to engage the grooves 44 and thus the module 50 is securely held in place by the latch 54, which preferably is provided on two opposing ends of the housing 52.

The housing 52 may support an input node 55 (which can be a switch or sensor) that can be actuated by the user or the environment and includes module circuitry 59 that allows the module 50 to be connected to a network (not shown) and to respond to input provided by the input node 55. As can be appreciated, a simple version of the input node 55 could be a simple on/off switch. A more complex version of the input node 55 could include a sensor or camera that allows for recognition/detection of patterns or environment conditions. As is known, a wide range of sensor technology exists (including chemical, thermal, sound, etc.) and this technology is regularly being updated and thus it is possible that new sensor technology may result in the desire to replace a module 50. For example, a Carbon Monoxide (CO) GO sensor with a back-up battery could be provided and once the sensor and/or back battery had reached a certain age/functionality the module 50 could be replaced.

The module circuitry 59 can include one or more of each of a controller 72 (which could be general purpose processor or a more limited circuit), a memory 74 (which can be one or an array of memory types), a power conversion circuit 76, and a communication system 78 (which could include one or more antennas and compatible transceivers) that can communicate with each other so that the module 50 can perform the desired tasks. As can be appreciated, if the user adds external components to the environment that are desired to be controlled by the module 50 (or to control the module 50) then the module 50 can either be programmed to provide the additional functionality (either directly or via an application that communicates with the module 50 remotely) or replaced with a new module 50 that has the desired functionality. To allow for direct programming, the module 50 could, for example but without limitation, include a connector that allows for external devices to directly reprogram the module 50.

As can be appreciated, the module 50 can be configured to wirelessly communicate and thus can wirelessly control external devices. As there are line outputs, the module 50 can also be configured to control those line outputs. The module 50 can also be configured to provide power in a predetermined arrangement (e.g., a powered USB port). In addition, the module 50 can also be configured to provide a more conventional outlet. In each case, due to the ability to include communication and controls and other intelligence in the module 50 via the module circuitry 59 (and potentially via a link to a remote server), the power/control provided by the module 50 can be configured in a desired manner. For example, a standard power outlet can be set up to turn on and off at desired times or in response to a signal received from another module 50 in the receptacle 20 or from a remote device. Other power shaping functions (such as smoothing, converting, isolating and limiting) in a power delivery module are also possible. Thus a wide range of use cases are possible.

It should also be noted that a more simplified receptacle 20 is also contemplated. Such a receptacle 20 might have power coming into each of the module sockets 40 (thus it would be a simple power distribution set-up) and each module 40 would simply receive power (which could be 120 VAC) via engagement with the power connector 60 and convert/use the power in an appropriate manner. For example, one module 50 could be configured to provide wireless power, another module 50 could be configured to power a speaker or act as a speaker, etc. The primarily limits on the capabilities of the modules 50 are thus space and thermal constraints.

In general it is expected to be desirable for the modules 50 to be capable of wireless communication. While not required, wireless communication allows for a wide range of potential uses and therefore is desirable to maximize the flexibility and control possible in the system. In an embodiment each module 50 can include, as part of the module circuitry 59, a transceiver configured to send and receive wireless signals via an antenna in a desired communication protocol.

As is known, a wide range of communication protocols exist. On one end of the protocol spectrum there are short range protocols such as Bluetooth that offers short range communication (and potential security due to the limited range). In the middle of the protocol spectrum there exist local area network (LAN) protocols such as ZigBee that offer low power consumption over a LAN and Wi-Fi that offer higher performance at higher power over a LAN. On the far end of the protocol spectrum there are wide area network (WAN) protocols, such as those offered by cellular companies, that offer varying rates of performance and range (2G protocols tend to have longer range but low performance, 4G and upcoming 5G protocols have higher performance but tend to have higher power requirements and shorter range). Thus, a wide range of protocols exist, some of which are standard-based and some of which are proprietary, and each protocol is intended for a particular (or set of) use case(s) and each protocol offers benefits in capabilities and power use. The modules 50 can take advantage of any desirable protocol by including the appropriate transceiver and antenna system. The ability to include the desired communication configuration in the module circuitry 59 allows each module to be designed to select the appropriate wireless configuration for the intended application and enables a wider range of controls. It should be noted that due to regular advancements in technology, new protocols are regularly being developed and the new developments may create a need to replace an existing module 50 with a new module 50 that has an upgraded communication system. In addition, a LAN can be set up to communicate with remote devices via an interface with a WAN (such as the Internet). As these wireless systems and levels of communication are available commercially and the requirements for implementing such systems are known, no further details regarding the wireless communication configuration will be provided herein.

As can be appreciated from the Figs., in an embodiment the receptacle can have three modules 50 inserted in three module sockets 40. Each such module 50 can be configured to be in wireless communication with the other modules 50 in the receptacle 20, with an external device (which could be a module 50 in a different receptacle 20 or a device that is not in a receptacle 20), a remote server via a WAN, or some combination thereof. While each module 50 can be configured for wireless communication, each module 50 can also provide a different function. The functions could include, without limitation, one or more of the following: actuation, environment sensing, power delivery, communication, external notification (which could be audio and/or visual) and system controls. As can be appreciated, therefore, what was a simple on-off switch can become part of an interconnected network that offers readily customizable functionality.

In an embodiment a system of modules 50 can be provided that includes an interface with an external server. This interface could relay through a local WiFi system and out through the Internet. The external server can provide control algorithms and enable communication with devices around the world. Alternatively, the system of modules 50 can include an smart module that includes the desired functionality/control without the need to communicate with an external server. The use of an external server is expected to offer certain functionality that is difficult to implement locally but a locally locked system may offer greater security. The system of modules 50 can thus be set up to provide the desired functionality depending on how the system is desired to be used.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A power control system, comprising:
a receptacle assembly, the receptacle assembly having a receptacle, a back plate, wire terminals and at least one power connector, wherein the receptacle has a front face and a bottom wall and defines at least one module socket between the front face and the bottom wall, each module socket having first and second rails which are positioned opposite one another and which generally extend between the front face and the bottom wall, each module socket further having first and second pairs of grooves which are positioned opposite one another and which generally extend between the front face and the bottom wall, the first rail being provided between the first pair of grooves, the second rail being provided between the second pair of grooves, each rail having a retaining notch positioned proximate to the front face, wherein the at least one power connector is in communication with the at least one module socket via the bottom wall, and wherein the back plate electrically couples the wire terminals to the at least one power connector, and at least one module which is configured to be mounted in the at least one module socket, each module having a housing, a contact, first and second pairs of projections and first and second latches, the contact being supported by the housing, each module having circuitry, wherein when the at least one module is mounted within the at least one module socket, the first pair of projections engage the first pair of grooves, the second pair of projections engage the second pair of grooves, the first latch engages the retaining notch of the first rail in a releasable manner, the second latch engages the retaining notch of the second raid in a releasable manner, and the contact electrically connects to the at least one power connector so as to provide power to the at least one module, the circuitry of the at least one module uses the power provided by the at least one power connector for a predetermined function.

2. The power control system of claim 1, wherein the predetermined function is configured to be altered via programming.

3. The power control system of claim 1, wherein the back plate includes circuitry which is configured to shape the power provided to the at least one power connector.

4. The power control system of claim 1, wherein the at least one module includes an input node.

5. The power control system of claim 4, wherein the module circuitry allows the at least one module to respond to input provided by the input node.

6. The power control system of claim 1, wherein the at least one module is configured for wireless communication.

7. The power control system of claim 1, wherein first and second modules are provided and wherein the receptacle includes first and second module sockets, wherein the first module is configured to be mounted in the first module socket, and wherein the second module is configured to be mounted in the second module socket.

8. The power control system of claim 7, wherein each of the first and second modules are configured for wireless communication and the first and second modules are configured to communicate with each other.

9. The power control system of claim 7, wherein the first module is configured to perform a first function and the second module is configured to perform a second function, wherein the first function is different from the second function.

10. The power control system of claim 1, wherein first, second and third modules are provided and wherein the receptacle includes first, second and third module sockets, wherein the first module is configured to be mounted in the first module socket, wherein the second module is configured to be mounted in the second module socket, and wherein the third module is configured to be mounted in the third module socket.

11. The power control system of claim 10, wherein each of the modules is configured for wireless communication and at least one of the modules is configured to communicate wirelessly with a device not positioned in the receptacle.

12. The power control system of claim 10, wherein the first module is configured to perform a first function, the second module is configured to perform a second function, and the third module is configured to perform a third function, wherein the first function is different from the second and third functions, and wherein the second function is different from the third function.

13. The power control system of claim 1, wherein each rail has a latch recess at the front face which allows the module to be mounted more flush with the receptacle.

14. The power control system of claim 1, further comprising a box, wherein the receptacle is configured to be mounted to the box.

15. The power control system of claim 14, wherein the box has wires that are connected to the wire terminals.

16. The power control system of claim 1, wherein the back plate is a printed circuit board.

17. The power control system of claim 1, wherein the power connector has power terminals and a housing, the power terminals being positioned inside the housing such that the power terminals are touch-safe.

18. The power control system of claim 1, wherein the module circuitry allows the at least one module to be connected to a network.

19. The power control system of claim 1, wherein the module circuitry includes one or more of each of a controller, a memory, a power conversion circuit, and a communication system.

* * * * *